United States Patent
Cummings et al.

(10) Patent No.: US 10,355,351 B2
(45) Date of Patent: Jul. 16, 2019

(54) ANTENNA ARRAY POINTING DIRECTION ESTIMATION AND CONTROL

(71) Applicants: Nathan Cummings, Gaithersburg, MD (US); Stanislavv Licul, Washington, DC (US)

(72) Inventors: Nathan Cummings, Gaithersburg, MD (US); Stanislavv Licul, Washington, DC (US)

(73) Assignee: Maxtena, Inc., Rockville, MD (US)

( * ) Notice: Subject to any disclaimer, the term of this patent is extended or adjusted under 35 U.S.C. 154(b) by 62 days.

(21) Appl. No.: 14/666,512

(22) Filed: Mar. 24, 2015

(65) Prior Publication Data
US 2018/0115062 A1    Apr. 26, 2018

Related U.S. Application Data

(60) Provisional application No. 61/982,287, filed on Apr. 21, 2014.

(51) Int. Cl.
| | | |
|---|---|---|
| *H01Q 3/08* | (2006.01) | |
| *G01S 3/42* | (2006.01) | |
| *G01S 3/44* | (2006.01) | |
| *H04B 7/06* | (2006.01) | |
| *H01Q 3/26* | (2006.01) | |

(52) U.S. Cl.
CPC .............. *H01Q 3/08* (2013.01); *G01S 3/42* (2013.01); *G01S 3/44* (2013.01); *H01Q 3/26* (2013.01); *H04B 7/0617* (2013.01)

(58) Field of Classification Search
CPC .......... H01Q 3/08; H01Q 3/26; H01Q 1/3275; H01Q 1/28; H01Q 1/08; H01Q 1/241; G01C 21/24; G01C 467/086; G01C 487/086; G01S 19/54

USPC ............................................. 342/359, 367
See application file for complete search history.

(56) References Cited

U.S. PATENT DOCUMENTS

| | | | | |
|---|---|---|---|---|
| 5,223,845 A | * | 6/1993 | Eguchi | H01Q 1/18 342/359 |
| 6,016,120 A | * | 1/2000 | McNabb | H01Q 1/1257 342/357.36 |
| 6,023,242 A | * | 2/2000 | Dixon | H01Q 1/125 342/359 |

(Continued)

FOREIGN PATENT DOCUMENTS

| | | | | |
|---|---|---|---|---|
| CN | 103022692 A | | 4/2013 | |
| GB | 2423191 A | * | 8/2006 | H01Q 1/241 |
| WO | WO 2013028443 A1 | * | 2/2013 | G01S 19/54 |

OTHER PUBLICATIONS

Extended European Search Report dated Sep. 14, 2015 in Patent Application No. 15001152.6.

(Continued)

*Primary Examiner* — Gregory C. Issing
(74) *Attorney, Agent, or Firm* — Patents and Licensing LLC; Daniel W Juffernbruch (57) ABSTRACT

Systems for maintain pointing of a phased array antenna in a direction maximizes to an extent possible the effective antenna gain is provided. The system includes a gyroscope and a Kalman Filter. The Kalman filter estimates an antenna pointing direction for each successive time step based on gyroscope readings and based on the results of a local search for maximum gain performed in the neighborhood of a previous antenna pointing direction.

14 Claims, 7 Drawing Sheets

(56) References Cited

U.S. PATENT DOCUMENTS

| | | | | |
|---|---|---|---|---|
| 6,043,778 | A * | 3/2000 | Froeberg | G01C 21/28 342/357.36 |
| 6,052,084 | A | 4/2000 | Aoshima et al. | |
| 6,377,211 | B1 * | 4/2002 | Hsiung | H01Q 1/3275 342/359 |
| 6,463,366 | B2 * | 10/2002 | Kinashi | G01C 21/24 342/357.36 |
| 6,538,602 | B2 * | 3/2003 | Natsume | H01Q 1/125 342/359 |
| 7,009,558 | B1 * | 3/2006 | Fall | G01S 19/47 342/359 |
| 7,522,102 | B2 * | 4/2009 | Shi | H01Q 1/28 342/354 |
| 7,898,476 | B2 * | 3/2011 | Nichols | H01Q 1/125 342/359 |
| 8,786,506 | B2 * | 7/2014 | Ayotte | H01Q 1/08 343/702 |
| 2002/0004691 | A1 * | 1/2002 | Kinashi | G01C 21/24 701/4 |
| 2005/0248486 | A1 * | 11/2005 | Lee | H01Q 3/02 342/359 |
| 2007/0001920 | A1 * | 1/2007 | Webb | H01Q 1/08 343/766 |
| 2008/0018545 | A1 | 1/2008 | Kaplan et al. | |
| 2008/0150798 | A1 | 6/2008 | Curry et al. | |
| 2010/0315288 | A1 * | 12/2010 | Liu | H04B 7/086 342/359 |
| 2012/0268344 | A1 * | 10/2012 | McCarthy | H01Q 1/28 343/893 |
| 2013/0321225 | A1 * | 12/2013 | Pettus | H01Q 3/08 343/765 |

OTHER PUBLICATIONS

Shin-ichi Yamamoto, et al., "An Antenna Tracking Method for Land-Mobile Satellite Communications System", Electronics and Communications in Japan, Part 1, vol. 78, No. 9, XP 000546392, Sep. 1995, pp. 91-102.

English Translation of CN103022692A provided by European Patent Office in corresponding patent application.

European Patent Office examination report dated Feb 20, 2018 in corresponding patent application.

* cited by examiner

ANTENNA ARRAY POINTING DIRECTION ESTIMATION AND CONTROL

RELATED APPLICATION DATA

This application is based on provisional application 61/982,287 filed Apr. 21, 2014.

FIELD OF THE INVENTION

The present invention relates generally to wireless communications with phased array antennas.

BACKGROUND

In many cases it would be desirable to conduct wireless communications with and/or from a moving vehicle or other moving object. For example, as far as vehicles, it would be desirable to conduct communications from a moving boat, airplane or truck and it is desirable to conduct communications from such vehicles through a communications satellite which may be in geosynchronous orbit but may also be in another orbit such that the satellite is moving relative to the earth and relative to a vehicle on the earth (even if the vehicle's position is stationary with respect to the earth).

Wireless communication systems use antennas to couple radio waves to and from the "free space" medium. Antennas come in very wide variety of types. For our present purpose, one relevant way in which antennas can be classified is whether they are high gain, directional antennas or low gain non-directional antennas. A high gain antenna has an advantage in that it increases link budget and thus can be used to sustain communication at a relatively higher information rate with a given allowance of energy per information symbol. This may enable types of communications such as audio, and video that require higher data rates than would simple text messages, for example. However to realize the aforementioned advantage of directional antennas, such antennas must be correctly pointed such that the high gain direction is aimed in the direction of another communication terminal with which communication is being conducted. This is problematic if the directional antenna is mounted on a moving vehicle and the difficulty is further compounded if the other communication terminal is moving such as would be the case if the other communication terminal is a non-geosynchronous satellite.

Mechanically steered directional antennas are available, however these are bulky, require extra clearance for movement, require expensive precision rotation mechanisms, servo motors and associated servo motor drive electronics. Such requirements limit the application of mechanically steered directional antennas.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to antenna pointing angle estimation and control. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Figure 1:
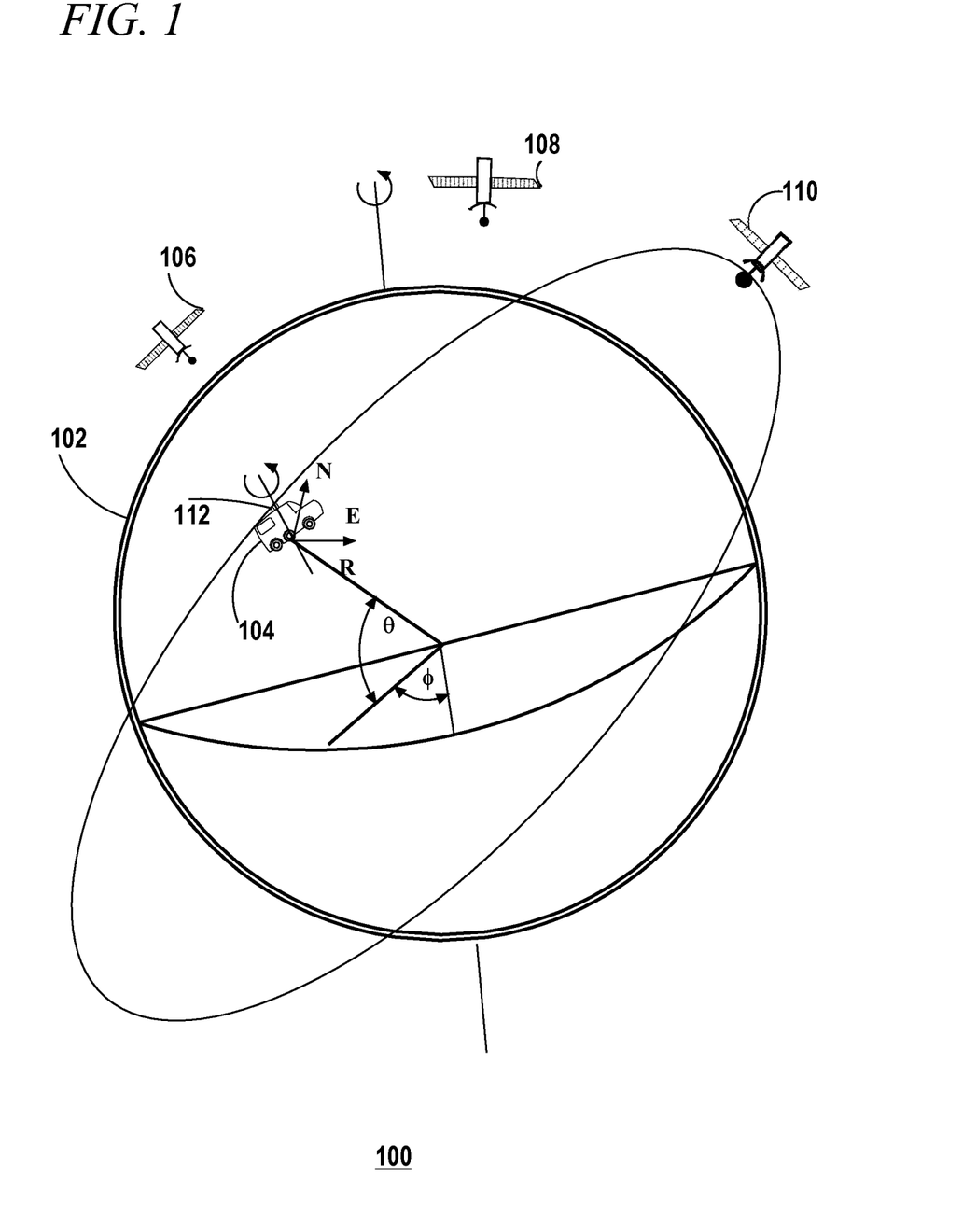
FIG. 1 is a schematic representation of a satellite communication system according to an embodiment of the invention.

FIG. 1 is a schematic representation of a satellite communication system 100 according to an embodiment of the invention. The earth 102 is represented by a doubled line circle and a vehicle in particular a truck 104 is located on the surface of the earth 102. In lieu of the truck 104 a sea going object (e.g., vehicle), a flying object (e.g., vehicle), or another type of apparatus that is mobile over land may be used. An Earth Centered Coordinate System (ECCS) 102 is represented by a latitude angular coordinate $\Theta$ and a longitude angular coordinate $\phi$ and radial coordinate R which is related to altitude.

It is also useful to consider a Local Earth Coordinate System (LECS) that has its origin at the position of the truck 104 and has its axes oriented at certain orientations relative to the earth. In particular, one form of LECS can have: a first axis ("North") oriented in a plane that includes the axis of rotation of the Earth facing up (in the compass North direction); a second axis ("East") oriented perpendicular to the plane that includes the axis of rotation of the earth, facing in the compass East direction; and a third axis "Up" oriented radially with respect to the center of the earth. Alternatively, the third axis may face oppositely, i.e., down toward the center of the earth.

Figure 2:
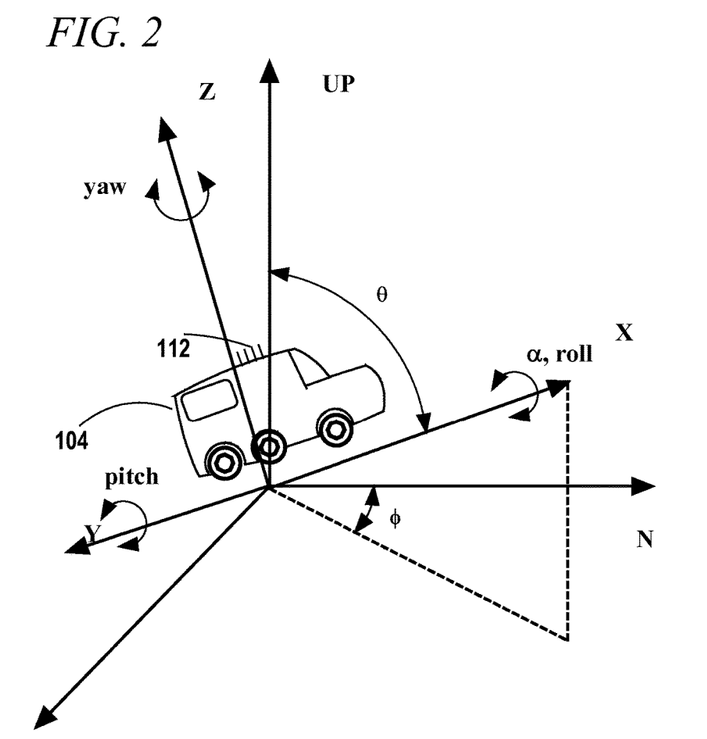
FIG. 2 schematically illustrates a vehicle equipped with a steerable phased array antenna and having an associated vehicle coordinate system that can be arbitrarily oriented in a local coordinate system.

The truck 104 (or other object) can, in general have any arbitrary orientation. Orientation of an object has three degrees of freedom. (Translation adds an additional three degrees of freedom) By way of example, one manner of specifying the orientation of an object is to specify the yaw, pitch and roll angles of the object. Another way is to use a quaternion that specifies a rotation. FIG. 2 schematically illustrates the truck 104 having an associated vehicle coordinate system that includes X, Y and Z axes that can be arbitrarily oriented in the LECS (North-East-Up coordinate system). The yaw, pitch and roll rotations are respectively rotations about the Z, Y, and X axes of the vehicle coordinate systems. By way of example the truck 104 can be driving on a road through a banked curve descending a mountain so that all three of the yaw, pitch and roll rotations occur as the truck 104 travels along its route.

The system 100 includes a number of satellites 106, 108, 110 including a first satellite 106, a second satellite 108 and a third satellite 110. The satellites 106, 108, 110 can, in general, include satellites that are in geostationary orbit and hence fixed in the ECCS and satellites that are not in geostationary orbit and hence not fixed in the ECCS.

The truck 104 is equipped with a phased array antenna 112 that can be configured to produce high gain patterns centered at any one of a set of directions. When the phased array antenna 112 is used to communicate with one of the satellites 106, 108, 110 it is beneficial to configure the phase array antenna 112 such that the high gain direction is as close as possible to the direction of the satellite. A benefit of doing so is to increase the link budget and allow for higher data rate communications at a given energy per information symbol. However, the movement of the satellites 106, 108, 110, movement of the truck 104 and the yaw, pitch and roll of the truck 104 tends to quickly render any previously established pointing direction obsolete.

Figure 3:
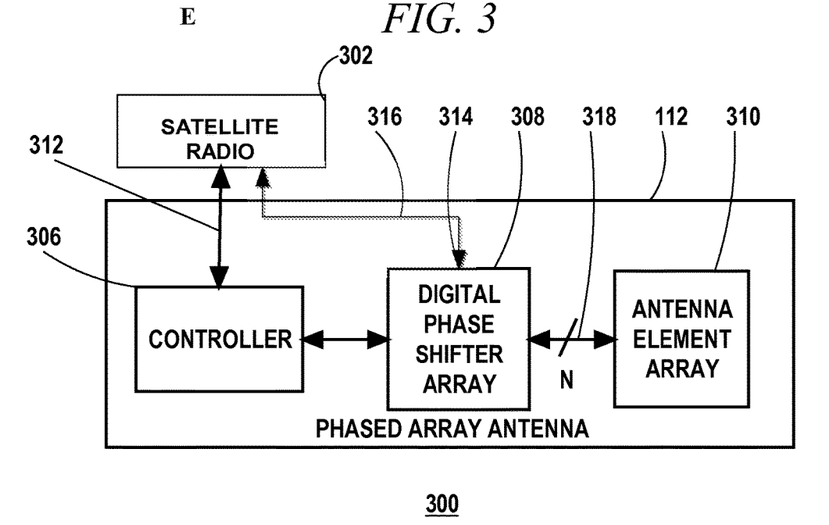
FIG. 3 is a block diagram of a radio system comprising a satellite radio coupled to a phased array antenna according to an embodiment of the invention.

FIG. 3 is a block diagram of a radio system 300 comprising a satellite radio 302 coupled to the phased array antenna 112 according to an embodiment of the invention. The phased array antenna 112 includes a controller 306 coupled to a digital phase shifter array 308 which is coupled to antenna element array 310. The satellite radio 302 is coupled to the controller 306 of the phased array antenna 112 through a control bus 312. An indication of the strength of a received signal can be coupled from the satellite radio 302 to the controller 306 through the control bus 312. Alternatively, a subsystem for measuring received signal strength is incorporated in the phased array antenna 112 itself. The satellite radio 302 is also coupled to an input/output port 314 of the digital phase shifter array 308 through a communication signal link 316. The digital phase shifter array 308 is coupled through a set of N (where N>1) antenna element channels 318 to the antenna element array 310. Each of the antenna element channels 318 serves one antenna element (see FIG. 4) of the antenna element array 310. Under the control of the controller 306, the digital phase shifter array 308 applies a requisite phase shift between the input/output port 314 and each of the antenna element channels 318 in order to steer the peak gain of the phased array antenna 112 in one of a set of directions. The controller 306 can monitor the strength of the received signal through information received via the control bus 312 while trying at least a subset of the set of the possible directions. In this way the controller can "search" for the best direction, i.e., the direction in which the peak gain direction is closest to the direction from which signal from one of the satellites 106, 108, 110 is received. However, blindly running through each direction will in many cases be ineffective because the amount of time required to check a given direction compared to the shorter time scale characterizing the changes in orientation of the truck 104 (or other vehicle or object).

Figure 4:
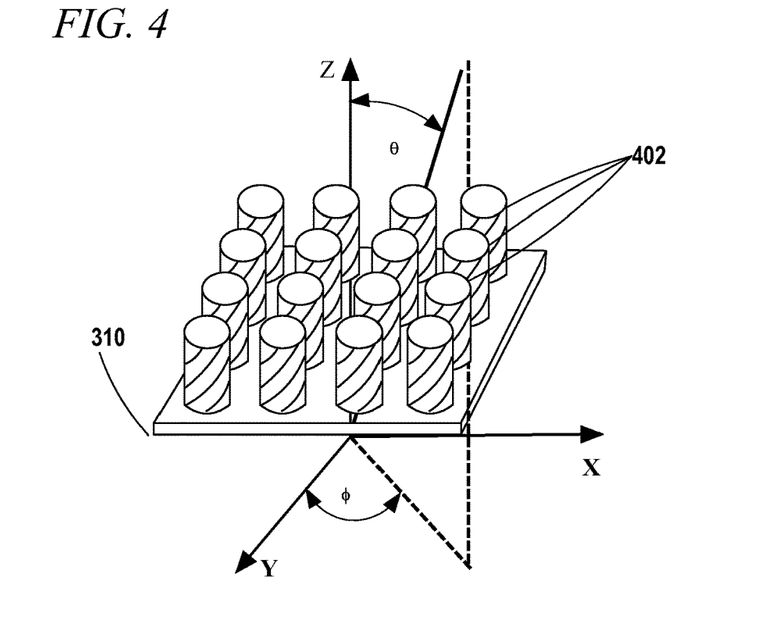
FIG. 4 is a perspective view of an antenna element array of a phased array antenna according to an embodiment of the invention.

FIG. 4 is a perspective view of the antenna element array 310 of the phased array antenna 112 according to an embodiment of the invention. The antenna element array 310 is an array of Quadrifilar Helical Antenna (QHA) elements 402 (a limited number of which are labeled to avoid crowding the drawing). Alternatively, in lieu of QHA elements another type of element, such as for example a patch antenna element, dipole, or slot can be used. As shown the antenna element array 310 is a four by four square array of QHA elements 402. Alternatively, a different number and/or a different pattern (i.e., non-square array) of elements may be used. Examples of QHA elements that may be used are disclosed in co-pending patent application Ser. No. 13/297,854 filed Nov. 16, 2011, entitled "Co-axial Quadrifilar Antenna". In certain embodiments of the present invention only one of the co-axial elements, i.e., either the inner or outer set of elements, disclosed in the '854 application may be used in the antenna element array 310. FIG. 4 shows a set of coordinate axes and a polar angle $\ominus$ and an azimuth angle $\phi$ superimposed on the drawing. The polar angle $\ominus$ and the azimuth angle $\phi$ can be used to describe the direction of maximum gain for a given configuration of the phased array antenna 112.

Figure 5:
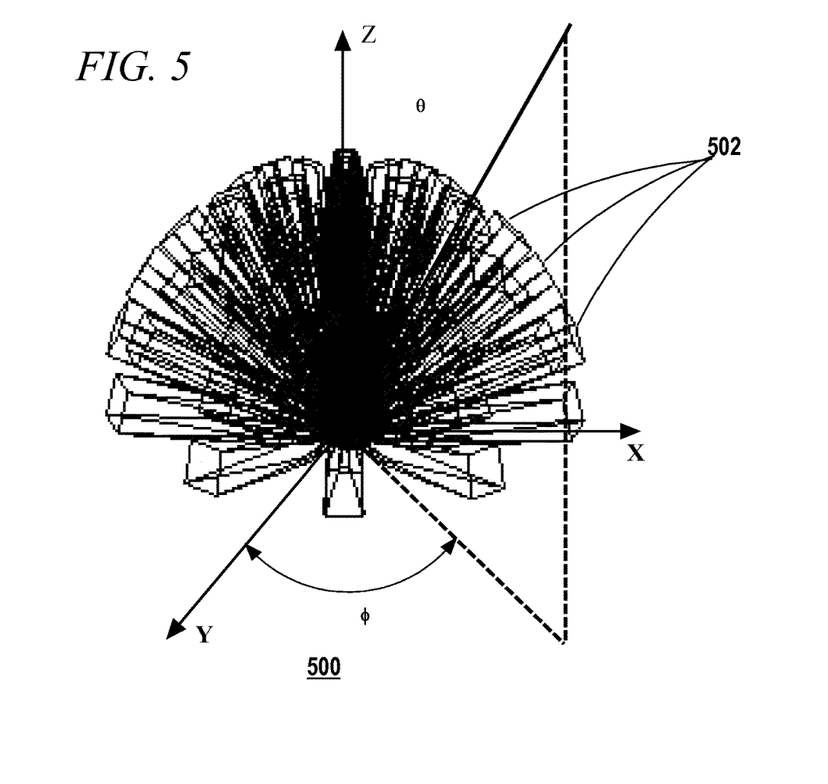
FIG. 5 is a spherical graph showing a set of possible gain patterns that can be produced with a phased array antenna, with each gain pattern centered on a particular azimuth $\phi$ and polar angle $\Theta$.

FIG. 5 is a spherical coordinate system graph 500 schematically representing a set of possible gain patterns 502 (a limited number of which are labeled to avoid crowding the drawing) that can be produced with a phased array antenna, with each gain pattern centered on a particular azimuth $\phi$ and polar angle $\ominus$. The gain patterns 502 are represented schematically, and in practice the shape of the gain patterns 502 may be different from what is depicted in FIG. 5. The same set of X, Y and Z coordinate axes presented in FIG. 4 establish the ($\phi,\ominus$) domain of the spherical graph 500 shown in FIG. 5. Also, because the phased array antenna 112 is fixed to the truck 104 (or other moving vehicle or moving object) the X, Y, Z axes of the coordinate system of the phased array antenna 112 either correspond to, or a have a fixed orientation with respect to the X, Y, Z axes of the vehicle coordinate system shown in FIG. 2. In the former case where the coordinate systems directly correspond, a yaw rotation of the vehicle will call for change in the azimuth of the antenna pointing direction, while pitch and roll rotations of the vehicle will call for a change in azimuth and/or polar angle of the antenna pointing direction.

Figure 6:
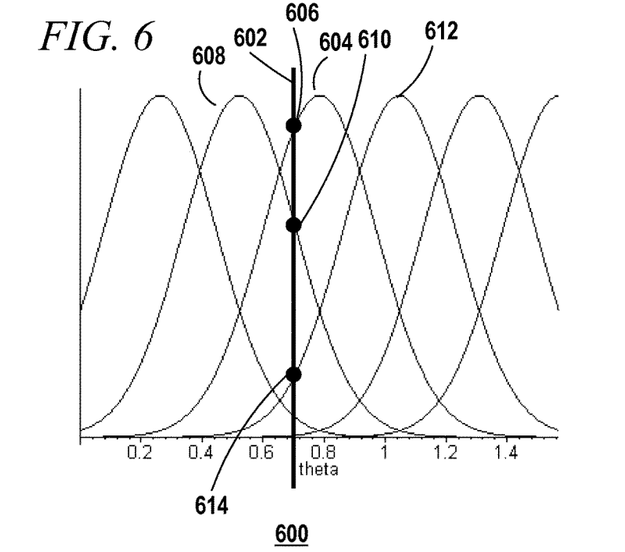
FIG. 6 is a graph including a schematic illustration of a 2-D cut through a set of adjacent gain patterns that can be produced with a phased array antenna.

FIG. 6 is a graph 600 including a schematic illustration of a 2-D cut through a set of adjacent gain patterns that can be produced with a phased array antenna (e.g., 112) according to an embodiment of the invention. Actual gain patterns may differ in shape from what is shown in FIG. 6. The 2-D cut represented in FIG. 6 corresponds to a cut at constant azimuth angle $\phi$ with the polar angle $\ominus$ varying from 0 to $\pi/2$. (However a qualitatively similar plot would be obtained taking a cut at constant polar angle ϴ with the azimuth angle ϕ varying or taking a cut through some arbitrary contour in the 2-D angle space, although in the latter case the peaks might vary substantially). With reference to FIG. 6 we assume that the azimuth angle ϕ to which the phased array antenna 112 has been pointed is as close as possible (though not in general equal) to the actual azimuth angle describing the position of a satellite with which communication is being conducted. We assume further that the satellite is located at a polar angle ϴ of 0.7 radians (40.1°). The graph 600 includes a vertical line 602 at the polar angle value of 0.7 radians.

To the extent that a digital phase shifter array 308 is used in the phase array antenna 112 the pointing angle cannot be adjusted infinitesimally Rather the phased array antenna 112 can have its direction of maximum gain set to one a certain finite set of directions each of which is described by an azimuth angle ϕ and a polar angle ϴ. In the example illustrated with reference to FIG. 6 we assume that the polar angle can be adjusted to multiples of π/6 radians (30°). (In practice the achievable polar angles may not be equally spaced.) A first gain pattern 604 with its peak at π/2 radians is closest to the polar coordinate (0.7 radians) of the satellite, and therefore produces the highest gain indicated by an upper dot 606 on the vertical line 602. A second gain pattern 608 with its peak at π/3 (to the left of the first gain pattern 604) exhibits a lower gain at 0.7 radians represented by middle dot 610. A third gain pattern 612 with its peak at (⅔)π (to the right of the first gain pattern 604) exhibits an even lower gain at 0.7 radians represented by lower dot 614.

In certain embodiments of the invention the controller 306 (or other controller in a system) will perform a "local search" around an estimated pointing angle (gain pattern) for a gain pattern that in fact produces the highest gain. For example if the first gain pattern 604 were estimated (by other subsystems to be described hereinbelow) to be the gain pattern that would maximize gain, a 1-D version of a local search could check the gain for the first gain pattern 604 and the two gain patterns adjacent to it which are the second gain pattern 608 and the third gain pattern 612. Through such a local search the controller 306 could determine which gain pattern actually produces the highest gain (highest dot on vertical line 602). The estimate made prior to the local search may be correct or it may be in error (e.g., off by one or more steps in angle).

In practice, in certain embodiments, rather than performing a 1-D local search, a 2-D local search is performed around an estimated pointing angle. For example we can identify an estimated best pointing angle as $(\Theta_i, \phi_k)$ where the index i identifies an $i^{th}$ polar angle to which the phased array antenna 112 can be steered and the index k identifies a $k^{th}$ azimuth angle to which the phased array antenna 112 can be steered, and there is a monotonic relation between the index k and the azimuth angle and there is a monotonic relation between the index l and the polar angle. In this case a local search can initially check all of the following pointing angles: $(\Theta_i, \phi_k)$ itself and all neighboring angles: $(\Theta_{i+1}, \phi_k)$, $(\Theta_{i-1}, \phi_k)$, $(\Theta_i, \phi_{k+1})$, $(\Theta_i, \phi_{k-1})$, $(\Theta_{i+1}, \phi_{k+1})$, $(\Theta_{i-1}, \phi_{k-1})$, $(\Theta_{i+1}, \phi_{k-1})$, $(\Theta_{i+1}, \phi_{k-1})$. In certain embodiments if the initial local search finds that one of the neighboring angles does in fact produce higher gain initially estimated pointing angle $(\Theta_i, \phi_k)$ a further search of angles adjacent to the pointing angle that produced the largest gain (but excluding angles already checked) can be performed. Alternatively, the local search can initially check just two angles in addition to estimated best pointing angle as $(\Theta_i, \phi_k)$. One of the angles will differ in respect to the azimuth angle ϕ and the second of the angles will differ in respect to the polar angle ϴ. From the gain values attained with these three directions, a discrete gradient estimate can be computed and then a fourth angle that is in the direction of the direction of the gradient can be checked, and the local search can proceed to follow the locally computed gradient.

Figure 7:
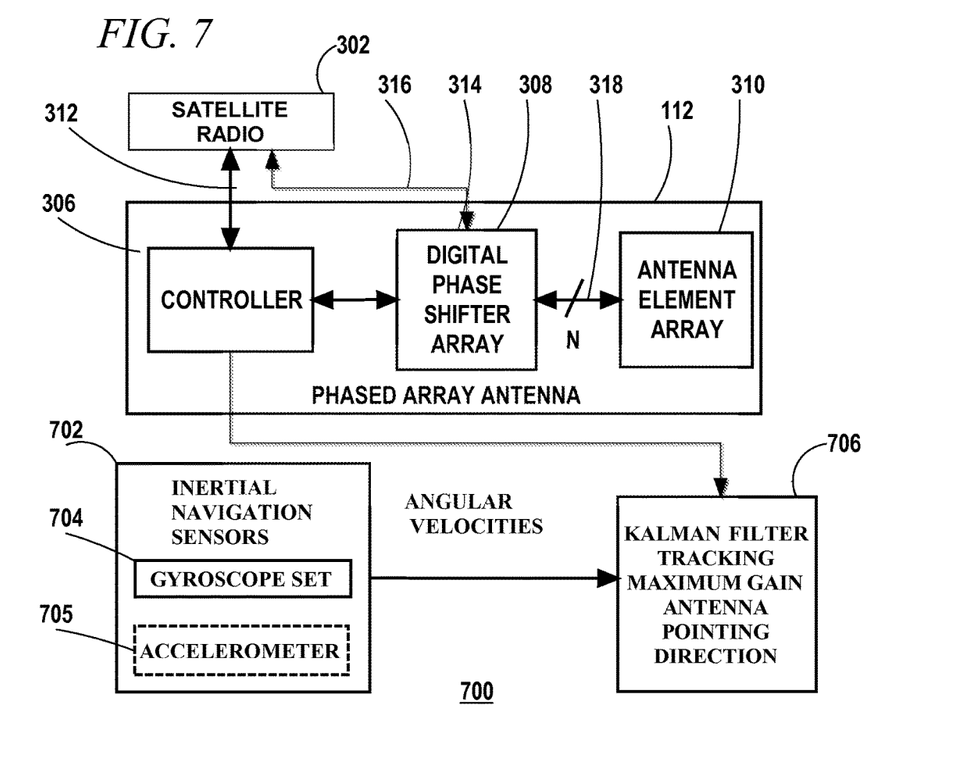
FIG. 7 is a block diagram of a system for setting and maintaining an antenna pointed at a second device (e.g., satellite) with which communications are conducted according to an embodiment of the invention.

FIG. 7 is a block diagram of a system 700 for maintaining an antenna (e.g., phased array antenna 112) pointed at a second device (e.g., one of the three satellites 106, 108, 110) with which communications are conducted according to an embodiment of the invention. The system 700 includes inertial navigation sensors 702 which include a gyroscope set 704 and optionally includes accelerometers 705 which can provide additional orientation information by measuring the direction of gravity. The gyroscope set 704 suitably includes three gyroscopes that indicate rotation rates about three mutually orthogonal axes which, by way of non-limiting example, may be the yaw, pitch and roll axes identified in FIG. 2. Outputs of the gyroscope set 704 are coupled to inputs of a Kalman filter 706 tracking the maximum gain antenna pointing direction. The Kalman filter 706 evolves a best estimate of the maximum gain pointing angle forward in time based on readings of the rate of rotation of the truck 104 (or other vehicle or object) that are output by the gyroscope set 704. The controller 306 is also coupled to the Kalman filter 706. The result of the "local search" described above which is also an estimate of the maximum gain antenna pointing direction and that is found by the controller 306 is output by the controller 306 and is input into the Kalman filter 706 as a sensor reading of the maximum gain antenna pointing direction. The Kalman filter 706 produces a new estimate for each new time step of a series of time steps based, in part, on the result of the local search and based, in part, on adjustments of a previous estimate based on the gyroscope readings. The rates of rotation of the truck 104 (or other vehicle or object) read from the gyroscope set 704 can be used to predict how the azimuth ϕ and elevation angle ϴ of the maximum gain pattern, which approximately corresponds to the direction to the second terminal (e.g., satellite 106, 108, 110) will change with each time increment. However the local search provides a second piece of information concerning the direction of the gain pattern that exhibits maximum gain.

If the satellite signal is lost, for example because the truck 104 has driven behind an obstruction (e.g., building), the Kalman filter 706 can continue to update antenna pointing direction so that when the truck passes the obstruction, the satellite radio 302 and phased array antenna 302 can begin to try to reacquire the satellite signal and the phased array antenna 112 will be more likely to be pointed in the correct direction or close to the correct direction, even if the orientation of the truck 104 has changed (e.g., because the truck turned a corner).

Figure 8:
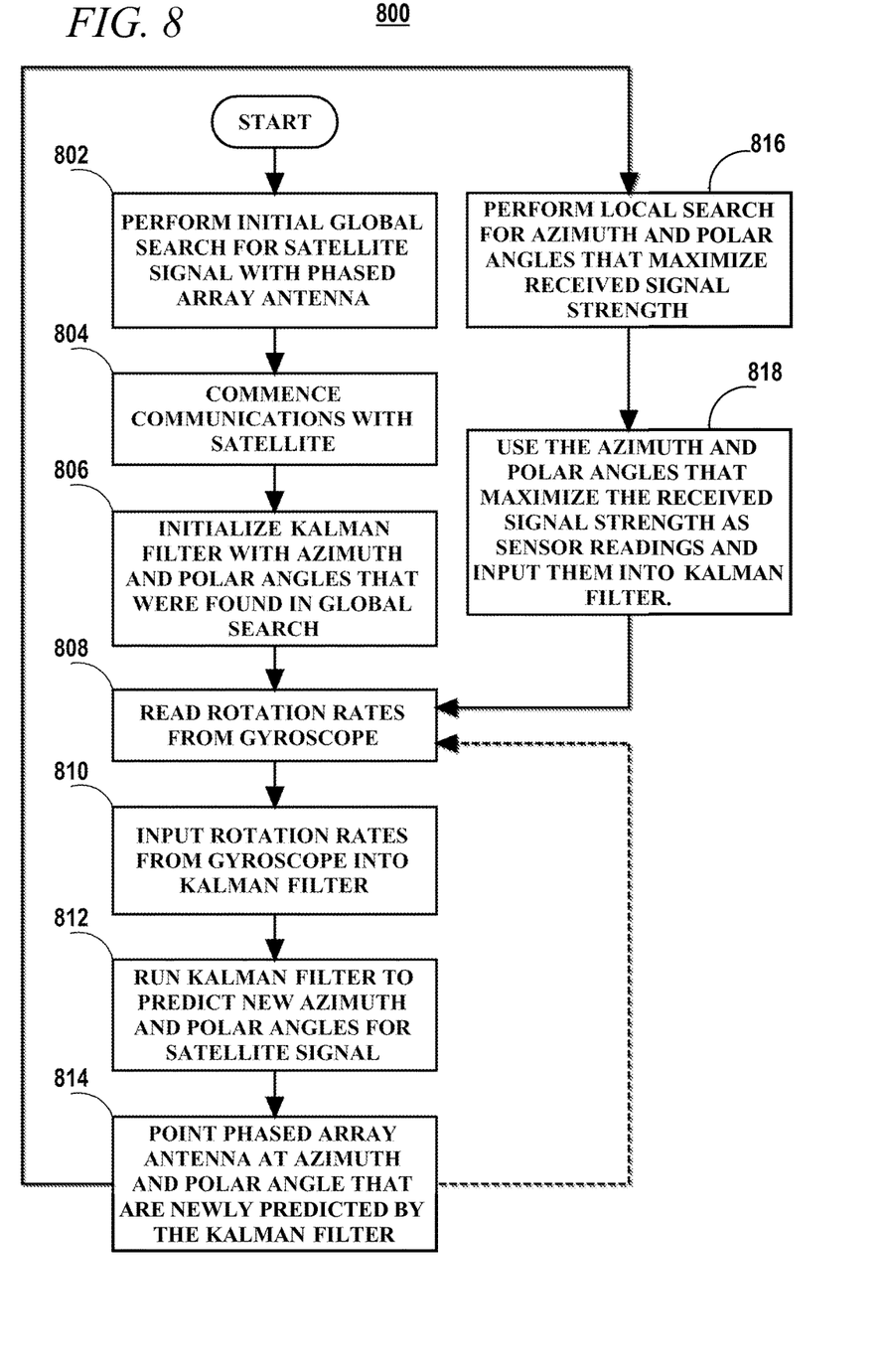
FIG. 8 is a flowchart of a method of maintaining an antenna pointed at a second device (e.g., satellite) with which communications are conducted according to an embodiment of the invention.

FIG. 8 is a flowchart 800 of a method of setting and maintaining an antenna (e.g., 112) pointed at a second device (e.g., satellite) with which communications are conducted according to an embodiment of the invention. In block 802 an initial global search for a satellite (or other second terminal communication device) is made. The global search can start a random or predetermined angle and search for the antenna pointing direction that maximizes gain. In block 804 communications with the second device (e.g., satellite) are commenced. It should be noted however that the global search will entail receiving signals from the second device, and can include decoding those signals. Moreover, it is also possible to commence communications when an antenna pointing direction that gives adequate signal strength is found and to continue the global search of block 802 while conducting communications.

In block 806 the Kalman filter 706 is initialized with the azimuth ϕ and polar ⊖ corresponding to the antenna pointing direction that was found in block 802.

In block 808 the rotation rates are read from the gyroscope set 704 and in block 810 the rotation rates are input into the Kalman filter.

According to certain embodiments which include accelerometers 705 in the inertial navigation sensors, the direction of gravity sensed by the accelerometers is also read and input into the Kalman filter as an additional sensor reading related to orientation.

In block 812 the Kalman filter is run in order to predict new values of the azimuth ϕ and polar ⊖ for the signal second terminal (e.g., satellite 106, 108, 110).

In block 814 the phased array antenna 112 is pointed in the direction predicted by the Kalman filter in block 812.

In block 816 a local search is performed to check if the new pointing angle or an adjacent pointing angle yields the maximum gain. The local search has been described hereinabove.

In block 818 azimuth and polar angles that were found in the local search, that is the azimuth ϕ and polar ⊖ angles describing the antenna pointing direction that resulted in maximum gain are input into the Kalman filter as sensor readings of the angles (e.g., satellite).

Thereafter, the flowchart 800 loops back to block 808 and proceeds as previously described.

In certain embodiments the local search that is performed in block 816 takes longer than an interval at which the inertial navigation sensors 702 update their readings. In such cases the system 700 can continue to update the antenna pointing direction based on estimates that are produced by the Kalman filter 706 as it continues to process new information from the inertial navigation sensors 702, and then, at intervals, when new AOA information is available from the local search the Kalman filter can incorporate that information. This alternative is signified by the dashed line connecting blocks 814 and 808 in FIG. 8.

Figure 9:
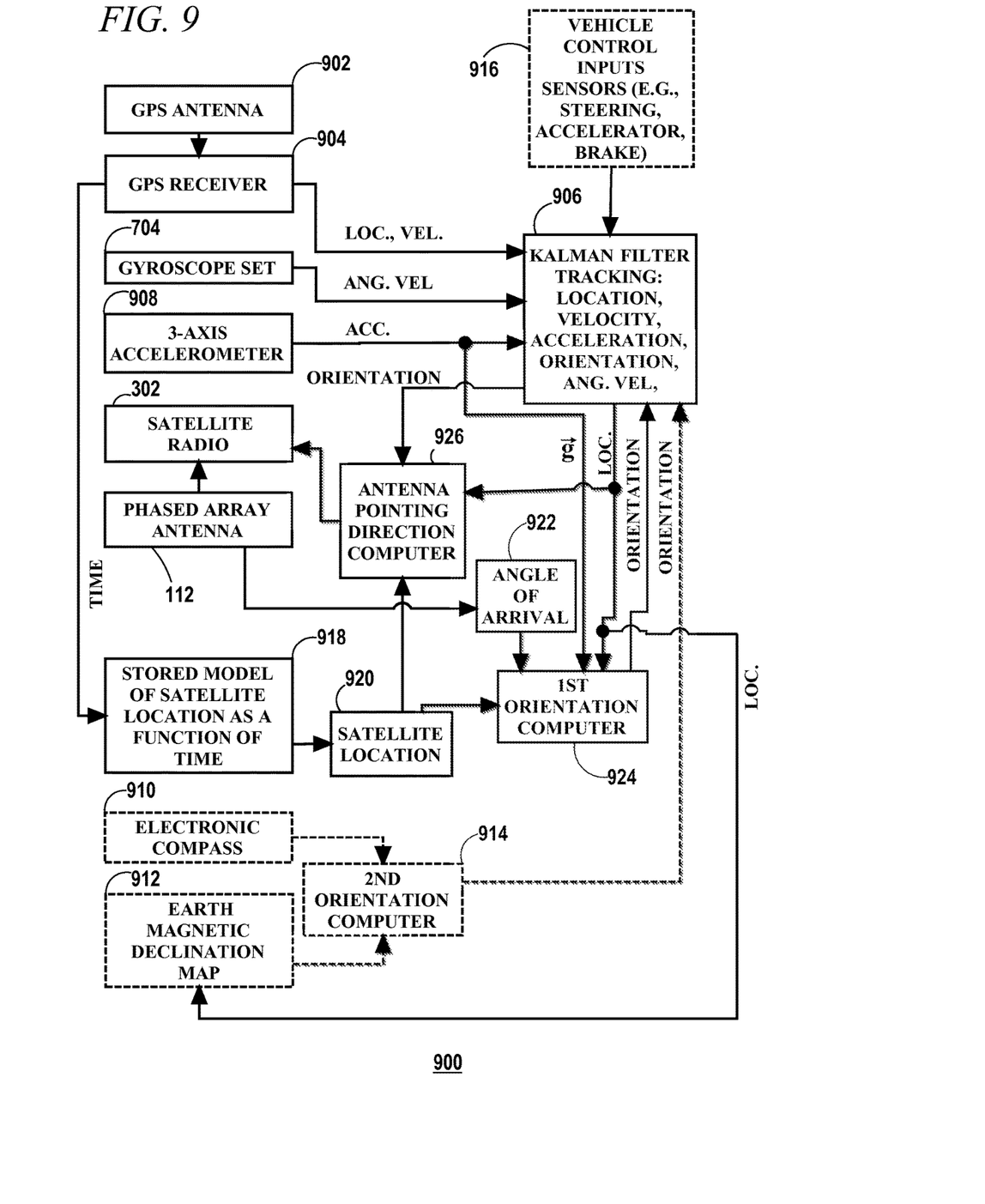
FIG. 9 is a block diagram of a system for maintaining an antenna pointed at a second communication terminal (e.g., satellite) and maintaining orientation information for a first apparatus that includes the antenna according to an embodiment of the invention.

FIG. 9 is a block diagram of a system 900 for maintaining a phased array antenna pointed at a second communication terminal (e.g., satellite, 106, 108, 110) and maintaining orientation information for a first apparatus (e.g., truck 104) that includes the phased array antenna according to an embodiment of the invention. The system is suitable for mounting on the truck 104 or other moving vehicle or object. The system 900 includes a GPS antenna 902 coupled to a GPS receiver 904. The GPS receiver 904 is coupled to a Kalman filter 906 that is tracking the location, velocity, acceleration, orientation and angular velocity of the truck 104 (or other moving vehicle or object). The GPS receiver 904 provides location and velocity estimates to the Kalman filter 906.

The gyroscope set 704 is also used in the system 900. The gyroscope set 704 provides angular velocity information (in three components) to the Kalman filter 906.

The system 900 also includes a 3-axis accelerometer 908 that is coupled to the Kalman filter 906 and provides acceleration information (in three components) to the Kalman filter 906.

An optional electronic compass 910 and stored earth magnetic declination map 912 are provided. A location estimate output by the Kalman filter 906 (but which may initially be obtained directly from the GPS receiver 904) provides location information to the earth magnetic declination map 912. The local magnetic declination output by the earth magnetic declination map 912 for the current location and a reading of the electronic compass are input to a second orientation computer 914 (the first will be described below), which computes an orientation estimate for the truck 104 (or other moving vehicle or object), and this orientation estimate is input into the Kalman filter 906.

Optional vehicle control input sensors 916, such as sensors on the steering, accelerator and brake of the truck 104 (or analogous parts of another vehicle or object) are also input into the Kalman filter 906.

A stored model of position of a satellite 106, 108, 110 (or more generally a second communication terminal) as a function of time 918, (e.g., satellite ephemeris) outputs a satellite location 920 at a current time. The stored model of satellite location as a function of time is coupled to the GPS receiver from which the current time is received. The current location of the truck 104 (or other moving vehicle or object) in combination with the current location of the satellite 106, 108, 110 can be combined to deduce what the polar and azimuth angles of the satellite, and hence the Angle of Arrival ($AOA_{calc}$) are in the Local Earth Coordinate System (LECS) which is described above with reference to FIGS. 1 and 2. By definition (with a high degree of accuracy) the direction of gravity in the LECS is in the negative "Up" axis direction, i.e., straight down.

An estimate of the actual Angle of Arrival ($AOA_{meas}$) 922 of the signal from the satellite is provided by the local search conducted by the controller 306 of the phased array antenna 112 as described above. A measurement of the local gravity vector is obtained (e.g., by low pass filtering) from the accelerometer 908.

The first orientation computer 924 is coupled to the 3-axis accelerometer 908, the Kalman filter 906, the phased array antenna 112, and the stored model of satellite location as a function of time. The first orientation computer 924 receives: the AOA estimate produced by local search 922 from the phased array antenna 122; an estimate of the gravity direction from the 3-axis accelerometer 908; the satellite location 920 from the stored model of satellite position as a function of time 918; and an estimate of the current location from the Kalman filter 906 (although initially or alternatively the current location estimate may be received from the GPS receiver 904 directly).

Based on knowledge of the directions of the AOA and gravity in both the vehicle coordinate system and the LECS, the orientation of the vehicle coordinate system in the LECS can be determined. This determination is done by the first orientation computer 924.

The system 900 also includes an antenna pointing direction computer 926. The antenna pointing direction computer is coupled to the Kalman filter 906, and the stored model of satellite location as a function of time 918. The antenna pointing direction computer 926 receives current estimates of the location and orientation of the truck 104 (or other moving vehicle or object) from the Kalman filter 906; and receives the satellite location 920 from the stored model of satellite location as a function of time 918. Based on the current estimate of the location truck (or other moving vehicle or object) that is provided by the Kalman filter 906, and based on the satellite location 920, the antenna pointing direction computer 926 computes the correct antenna pointing direction in the LECS (see FIG. 2), and then subsequently translates the correct pointing direction into the vehicle coordinate system (see FIG. 2) based on the orientation estimate for the truck (or other moving vehicle or object) maintained by the Kalman filter 906.

The Kalman filter 906 aggregates various sources of information on the orientation, including the information from the first orientation computer 924, information from the second orientation computer 914, information from the gyroscope set 704 and accelerometers 908. The first orientation computer 924 uses the maximum gain (AOA) information received from the phased array antenna 112. Alternatively rather than using the Kalman filter 906 to aggregate orientation information a least squares estimator is used as an orientation information aggregator. All of the blocks 112, 302, 704, 902, 904, 906, 908, 922 that feed into the first orientation computer 924 along with the first orientation computer itself can be considered a first subsystem that determines one orientation estimate. The second orientation computer 914 and the blocks which feed into it 910, 912 can be considered a second subsystem that determines another orientation estimate.

According to certain embodiments, which are appropriate for vehicles for which the orientation of the vehicle or object is aligned with the direction of the travel (e.g., a truck that can only travel forward or is assumed to be traveling forward, but not in reverse), the velocity information obtained from the GPS receiver can be used as yet another orientation estimate (although the information is not complete in that the roll orientation is not necessarily determined by the velocity).

Figure 10:
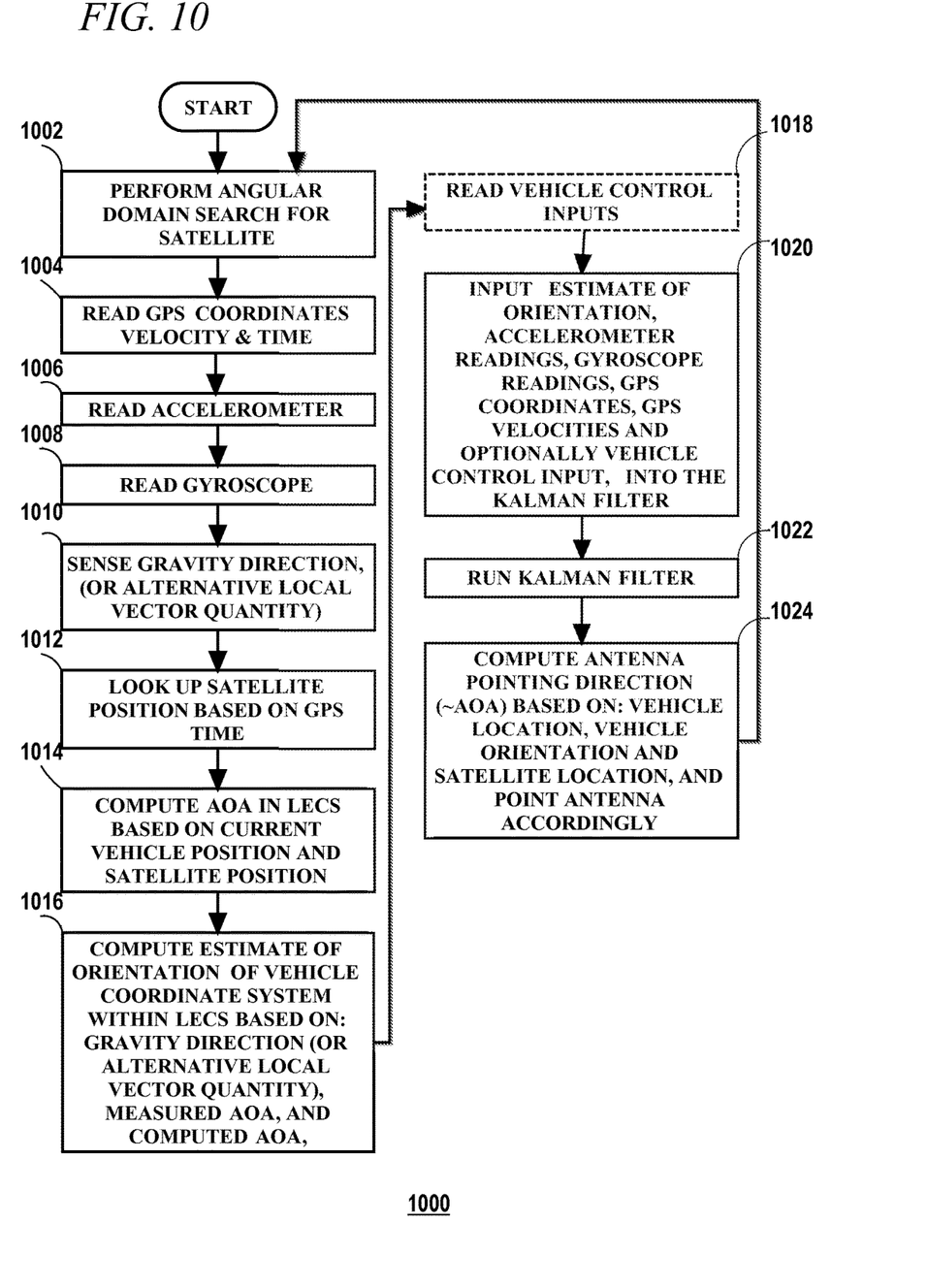
FIG. 10 is a flowchart of a method of maintaining an antenna pointed at a second device (e.g., satellite) and for maintaining orientation information for an apparatus that includes the antenna according to an embodiment of the invention.

FIG. 10 is a flowchart 1000 of a method of maintaining an antenna pointed at a second device (e.g., satellite) and for maintaining orientation information for an apparatus that includes the antenna according to an embodiment of the invention. In block 1002 an antenna (e.g., 112) is used to search an angular domain (e.g., domain over azimuth φ and polar θ angle ranges) for a maximum gain direction. When block 1002 is initially executed, the search can be a global search described above, which can for example cover an entire discretized $2\pi$ steradian hemisphere. When block 1002 is subsequently executed the search that is executed can be a local search as described above.

In block 1004 a current location, velocity of the truck 104 (or other moving vehicle or object) and the current time provided by a GPS receiver (e.g., 904) are read.

In block 1006 an accelerometer's (e.g., 3 axis accelerometer 908) output is read and in block 1008 a gyroscope's (e.g., 704) output is read.

In block 1010 the direction or gravity is sensed. Alternatively the direction of another know local vector quantity is sensed. An example of another known local vector quantity is the earth's magnetic field, which may, for example be known based on the known earth magnetic declination map 912. Another example of a known local vector quantity is the direction to a known celestial object which can be sensed optically.

In block 1012 the position of the satellite which was searched for in block 1002 is looked up in stored information (e.g., 918).

In block 1014 the AOA of the signal from the satellite is computed in the LECS based on the current vehicle or object (e.g., 104) position and the stored information on the satellite.

In block 1016 the orientation of the vehicle or object (e.g., 104) within (with respect to) the LECS is calculated based on: the measured AOA (corresponding to the direction of maximum gain) found in block 1002; the AOA calculated in block 1014; measurements of local gravity direction sensed in block 1010 (or direction of alternative local vector quantity as discussed above), and separately available information of the gravity (or alternative local vector quantity) in the LECS. Note that gravity is trivially directly down in the LECS (to a high degree of approximation).

In optional block 1018 vehicle or object (e.g., 104) control inputs (e.g., steering, accelerator, brake) are read. In a "fly by wire" system there may be no need for separately provisioned sensors to take control input readings, and the controls themselves generate electrical signals that may be read. The control inputs may be read through a signal conduit (e.g., wire or fiber optic) or wirelessly.

In block 1020 the orientation estimate generated in block 1016, the accelerometer readings, gyroscope readings, GPS coordinates, GPS velocities and optionally the vehicle control inputs are input into a Kalman filter that is tracking the vehicle position, vehicle velocity and vehicle orientation, and in block 1022 the Kalman filter is run to determine new estimates of the aforementioned parameters.

In block 1024 a best estimate antenna pointing direction (AOA) for best gain is computed based on: the vehicle location, vehicle orientation, and satellite location and the antenna is pointed accordingly. After block 1024 the method loops back to block 1002 and continues to operate as described above.

If the phased array antenna 112 and satellite radio 302 cease receiving the satellite signal, for example because the truck 104 has driven into a tunnel, the Kalman filter 906 can continue to update orientation information for the truck and the orientation information can be used by the antenna pointing direction computer 926 to continue to update the antenna pointing direction so that when the truck emerges from the tunnel, the satellite radio 302 and phased array antenna 302 can begin to try to reacquire the satellite signal and the phased array antenna will be more likely to be pointed in the correct direction or close to the correct direction, even if the orientation of the truck 104 has changed (e.g., because the road within the tunnel is curved).

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. Any letter designations such as (a) or (b) etc. used to label steps of any of the claims herein are step headers applied for reading convenience and are not to be used in interpreting an order or process sequence of claimed method steps. Any claimed steps that recite a particular order or process sequence will do so using the words of their text, not the letter designations.

It will be appreciated that embodiments of the invention described herein may be comprised of one or more conventional processors and unique stored program instructions that control the one or more processors to implement, in conjunction with certain non-processor circuits, some, most, or all of the functions of phased array antenna pointing direction control described herein. The non-processor circuits may include, but are not limited to, a radio receiver, a radio transmitter, signal drivers, clock circuits, power source circuits, and user input devices. As such, these functions may be interpreted as steps of a method to perform phased array antenna pointing direction control. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method with an antenna array of an earth bound device pointed at a satellite, the method comprising:
    (a) obtaining a first position in an earth centered coordinate system (ECCS) of the earth bound device;
    (b) looking up a second position in the earth centered coordinate system (ECCS) of the satellite based on a stored model of satellite location as a function of time;
    (c) determining an angle of arrival expressed within a local earth coordinate system (LECS) of a signal coming from the satellite to the antenna array based on i) the second position of the satellite looked up in said step (b), ii) the first position of the antenna array of the earth bound device obtained in said step (a), and iii) an orientation of the earth bound device;
    (d) determining an estimated direction in a vehicle coordinate system (VCS) of a local vector quantity at the first position of the antenna array of the earth bound device and for determining said orientation using locally sensed values at the earth bound device chosen from the group consisting of a direction of gravity, a direction to a celestial object, and magnetism of the earth;
    (e) performing a local search using the angle of arrival estimate in the vehicle coordinate system (VCS) determined in said step (d) to find a pointing angle of the antenna array having a highest gain and said orientation;
    (f) determining an orientation of the antenna array in the local earth coordinate system (LECS) based on the angle of arrival expressed within the local earth coordinate system (LECS) of the signal coming from the satellite determined in said step (c) and the estimated direction of the vector quantity determined in said step (d), the local earth coordinate system;
    (g) correcting the orientation of the antenna array in the local earth coordinate system (LECS) determined in said step (f) using the angle of arrival in the local earth coordinate system (LECS) determined in said step (c) to produce a corrected orientation of the antenna array in the local earth coordinate system (LECS);
    (h) translating the corrected orientation of the antenna array in the local earth coordinate system (LECS) into a pointing direction of the antenna array within the vehicle coordinate system (VCS); and
    (i) pointing the antenna array to the pointing direction within the vehicle coordinate system (VCS).

2. A method according to claim 1, wherein said step (d) of determining the estimated direction of the local vector quantity at the first position of the antenna array of the earth bound device comprises a substep of (d)(1) determining a direction of gravity.

3. A method according to claim 1, wherein said step (d) of determining the estimated direction of the local vector quantity at the first position of the antenna array of the earth bound device comprises a substep of (d)(1) determining a direction to a celestial object.

4. A method according to claim 1, wherein said step (d) of determining the estimated direction of the local vector quantity at the first position of the antenna array of the earth bound device comprises a substep of (d)(1) determining magnetism of the earth.

5. A method according to claim 1, wherein the local earth coordinate system (LECS) has an axis pointing towards or away from a center of the earth.

6. A method according to claim 1, wherein said step (e) of performing a local search further comprises the step of (e1) finding the pointing angle of the antenna array having a highest gain expressed within a local earth coordinate system (LECS).

7. An apparatus, comprising:
    a global position satellite receiver operatively coupled to an antenna for reading a first position of an earth bound device;
    a satellite location computer and a satellite location model memory for looking up a second position of a satellite based on a stored model of satellite location as a function of time;
    an angle of arrival computer operatively coupled to the global position satellite receiver and the satellite location computer for determining an angle of arrival of a signal coming from the satellite to the antenna array based on i) the position of the satellite from the satellite location computer, ii) the position of the antenna array of the earth bound device expressed within a local earth coordinate system from the global position satellite receiver, and iii) an orientation of the earth bound device;
    an antenna orientation computer coupled to an aggregator that is coupled to one or more earth bound device sensors for determining an estimated direction of a local vector quantity at the first position of the antenna array of the earth bound device and for determining said orientation using locally sensed values from the earth bound device sensors chosen from the group consisting of a direction of gravity, a direction to a celestial object, and magnetism of the earth;
    wherein the antenna orientation computer is operatively coupled to the angle of arrival computer and the aggregator for performing a local search using the angle of arrival estimate in the vehicle coordinate system (VCS) determined by the angle of arrival computer to find a pointing angle of the antenna array having a highest gain and said orientation;

wherein the antenna orientation computer is operatively coupled to the angle of arrival computer for determining an orientation of the antenna array in the local earth coordinate system (LECS), based on the angle of arrival expressed within the local earth coordinate system of the signal coming from the satellite determined by the angle of arrival computer and the estimated direction of a vector quantity determined by the antenna orientation computer, the local earth coordinate system;

an antenna pointing direction computer operatively coupled to the aggregator and the antenna orientation computer and the satellite position computer for correcting the orientation of the antenna array in the local earth coordinate system (LECS) determined by said antenna orientation computer using the angle of arrival in the local earth coordinate system (LECS) determined by said angle of arrival computer to produce a corrected orientation of the antenna array in the local earth coordinate system (LECS);

wherein the antenna pointing direction computer translates the corrected orientation of the antenna array in the local earth coordinate system (LECS) into a pointing direction of the antenna array within the vehicle coordinate system (VCS); and a satellite radio operatively coupled to the antenna pointing direction computer for pointing the antenna array to the pointing direction within the vehicle coordinate system (VCS).

8. An apparatus according to claim 7, wherein said antenna orientation computer determines the direction of the local vector quantity at the first position of the antenna array of the earth bound device pointing by determining a direction of gravity.

9. An apparatus according to claim 7, wherein said antenna orientation computer determines the direction of the local vector quantity at the first position of the antenna array of the earth bound device pointing by determining a direction to a celestial object.

10. An apparatus according to claim 7, wherein said antenna orientation computer determines the direction of the local vector quantity at the first position of the antenna array of the earth bound device pointing by determining magnetism of the earth.

11. An apparatus according to claim 7, wherein the local earth coordinate system (LECS) has an axis pointing towards or away from a center of the earth.

12. An apparatus according to claim 7, wherein the antenna orientation computer 924 performs the local search to find the pointing angle of the antenna array having a highest gain expressed within a local earth coordinate system (LECS).

13. An apparatus according to claim 7, wherein said one or more earth bound device sensors are selected from the group consisting of 1) a gyroscope, 2) an accelerometer, 3) vehicle sensors, 4) a compass, and 5) an earth magnetic declination map connected to another orientation computer.

14. An apparatus according to claim 7, wherein said aggregator is chosen from a group of aggregators consisting of a Kalman filter and a least squares estimator.

* * * * *

UNITED STATES PATENT AND TRADEMARK OFFICE
CERTIFICATE OF CORRECTION

PATENT NO. : 10,355,351 B2
APPLICATION NO. : 14/666512
DATED : July 16, 2019
INVENTOR(S) : Nathan Cummings et al.

Page 1 of 1

It is certified that error appears in the above-identified patent and that said Letters Patent is hereby corrected as shown below:

In the Claims

In Claim 1, Column 11, Line 67, after: "step (d)" please delete: ", the local earth coordinate system".

In Claim 7, Column 13, Lines 11-13, after: "by the antenna orientation computer" please delete: ", the local earth coordinate system".

Signed and Sealed this
Tenth Day of September, 2019

Andrei Iancu
*Director of the United States Patent and Trademark Office*